United States Patent
Kwon et al.

(10) Patent No.: US 7,255,270 B2
(45) Date of Patent: Aug. 14, 2007

(54) METHOD AND APPARATUS FOR SEARCHING RIGHTS OBJECTS STORED IN PORTABLE STORAGE DEVICE USING OBJECT LOCATION DATA

(75) Inventors: Moon-sang Kwon, Seoul (KR); Yun-sang Oh, Seoul (KR); Kyung-im Jung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 210 days.

(21) Appl. No.: 11/177,390

(22) Filed: Jul. 11, 2005

(65) Prior Publication Data

US 2006/0006220 A1 Jan. 12, 2006

Related U.S. Application Data

(60) Provisional application No. 60/586,724, filed on Jul. 12, 2004.

(30) Foreign Application Priority Data

Sep. 10, 2004 (KR) .................. 10-2004-0072555

(51) Int. Cl.
*G06K 5/00* (2006.01)

(52) U.S. Cl. .................. 235/382; 235/487; 235/492; 713/176; 705/59

(58) Field of Classification Search ............... 235/382
See application file for complete search history.

(56) References Cited

U.S. PATENT DOCUMENTS

| 6,135,646 | A | 10/2000 | Kahn et al. |
| 6,535,871 | B1 | 3/2003 | Romansky et al. |
| 6,968,996 | B2 * | 11/2005 | Reddy et al. ............... 235/380 |
| 6,993,131 | B1 * | 1/2006 | Meyers ....................... 380/201 |

FOREIGN PATENT DOCUMENTS

| JP | 2004-46833 A | 2/2004 |
| JP | 2004-80751 A | 3/2004 |
| KR | 2002-0020104 A | 3/2002 |
| WO | WO 03/003248 A1 | 1/2003 |

* cited by examiner

*Primary Examiner*—Seung Ho Lee
(74) *Attorney, Agent, or Firm*—Sughrue Mion, PLLC

(57) ABSTRACT

There is provided a method and an apparatus for searching rights objects stored in a portable storage device by using an object location data. The method includes: accessing the portable storage device; transmitting an object identifier to the portable storage device; receiving a location data of a first object searched based on the object identifier from the portable storage device; storing the location data of the first object with the object identifier; and transmitting the location data of the first object and an operation data representing operations to be performed with the first object to the portable storage device by using the location data of the first object.

35 Claims, 7 Drawing Sheets

FIG. 3

| 131 | 132 | 133 | 134 | | 130 | | 139 |
|---|---|---|---|---|---|---|---|
| 1 | Object 1 | ID 1, 1 | ID 1, 2 | ID 1, 3 | ID 1, 4 | ... | ID 1, N | meta 1 |
| 2 | Object 2 | ID 2, 1 | ID 2, 2 | ID 2, 3 | ID 2, 4 | ... | ID 2, N | meta 2 |
| 3 | Object 3 | ID 3, 1 | ID 3, 2 | ID 3, 3 | ID 3, 4 | ... | ID 3, N | meta 3 |
| ... | ... | ... | ... | ... | ... | ... | ... | ... |
| M | Object M | ID M, 1 | ID M, 2 | ID M, M | ID M, 4 | ... | ID M, N | meta M |

Object mapping table 140

FIG. 4

| location | Stored Rights Object | Content Identifier | Rights Object Identifier | Content Provider | Identifier 4 | ... | Identifier N | Metafield |
|---|---|---|---|---|---|---|---|---|
| 1 | Object 1 | Hash(1058) | Hash(RID_837) | Hash(Beethoven) | ID 1, 4 | ... | ID 1, N | 0 |
| 2 | Object 2 | Hash(132) | Hash(RID_5396393) | Hash(Sting) | ID 2, 4 | ... | ID 2, N | 0 |
| 3 | Object 3 | Hash(7985214) | Hash(RID_39741) | Hash(Beatles) | ID 3, 4 | ... | ID 3, N | 0 |
| ... | ... | ... | ... | ... | ... | ... | ... | ... |

FIG. 6

| Type of Object Identifier | Object Identifier | Object Location | Object Location | Object Location | Object Location | Object Location |
|---|---|---|---|---|---|---|
| Content Producer | Hash(Beethoven) | 120 | 140 | | 300 | |
| Content Producer | Hash(Beatles) | 150 | 250 | | | |
| Rights Object Identifier | Hash(RID_39741) | 123 | 231 | | 345 | |
| Content Identifier | Hash(CID_536) | 39 | 62 | | | |

METHOD AND APPARATUS FOR SEARCHING RIGHTS OBJECTS STORED IN PORTABLE STORAGE DEVICE USING OBJECT LOCATION DATA

CROSS-REFERENCE TO RELATED APPLICATIONS

This application claims priority from Korean Patent Application No. 10-2004-0072555 filed on Sep. 10, 2004 in the Korean Intellectual Property Office, and U.S. Provisional Patent Application No. 60/586,724 filed on Jul. 12, 2004 in the United States Patent and Trademark Office, the disclosures of which are incorporated herein by reference in their entirety.

BACKGROUND OF THE INVENTION

1. Field of the Invention

Apparatuses and methods consistent with the present invention relate to searching rights objects stored in a portable storage device using object location data.

2. Description of Related Arts

Recently, digital rights management (DRM) has been actively researched and developed, and used in commercial services. DRM needs to be used in commercial services because of the following various characteristics of digital content. Unlike analog data, the digital content can be copied without loss and can be easily reused, processed and distributed. However, a large amount of cost, labor, and time are needed to produce the digital content. When the digital content is copied and distributed without permission, a producer of the digital content may lose profit, and the producer's enthusiasm may be discouraged. As a result, development of digital content business may be hampered.

There have been several efforts to protect digital content. Conventionally, digital content protection has been concentrated on preventing non-permitted access to digital content, and permitting only people who have paid charges to access the digital content. However, when a person who has paid charges intentionally distributes the digital content to other people, these other people can use the digital content without paying charges. To solve this problem, DRM was introduced. In DRM, any one is allowed to freely access encrypted digital content, but a license referred to as a rights object is needed to decrypt and execute the digital content. Accordingly, the digital content can be more effectively protected by using DRM, as compared to the conventional method.

A portable storage device is a connectable/disconnectable device such as a portable phone, a computer, or a digital camera which can store data of various types of digital equipment and is portable. The portable storage device includes a storage space for storing data and a portion performing an operation and control. A multimedia card (MMC) is a portable storage device which stores multimedia data to be used for various types of digital equipment, overcoming limitations of conventional hard disks or compact disks. The MMC also includes an operation part that is not included in conventional storage media, thereby having the ability to perform control. Recently, a security function was added to the MMC, thereby developing a secure MMC that secures digital content during storage and transmission and protects copyright. With the development of the secure MMC, rights management on digital content becomes possible in a storage device and digital equipment. Hereinafter, digital equipment such as a digital camera, a portable phone, a computer and a digital camcorder will be collectively referred to as a "host device."

Recently, memory cards including a flash memory have popularized as portable storage devices. Different from a dynamic random access memory (DRAM) or a synchronization random access memory (SRAM), these portable storage devices can maintain data without power supply. However, they are disadvantageous in that input and output speeds of data are slower than in the DRAM.

A rights object stored in a portable storage device is information to be referenced whenever content is reproduced, which requires repetitive reading, writing or modifying operations. To effectively perform these repetitive operations, it is necessary to reduce time consumed in searching for a specific rights object.

A conventional method of providing a cache function through an SRAM to thereby increase input/output speeds of a memory card has been presented in Korean Patent publication No. 2002-0020104. In the conventional method, the SRAM is initialized when the memory card is connected to a digital device and thereafter functions as a cache memory storing specific data therein during read and write operations, thereby increasing input/output speed.

The conventional method may increase the input/output speed when searching again data which has been previously searched but it cannot decrease inherent delay caused in data searching.

In particular, since the portable storage device storing rights objects therein under the DRM system repeatedly performs input/output operations for a specific rights object and operations for searching each rights object with various conditions, there is a need for a method to improve the speeds of inputting/outputting objects and searching the objects.

SUMMARY OF THE INVENTION

In accordance with an aspect of the present invention, there is provided a method for increasing a speed of using objects stored in a portable storage device by promptly searching the objects.

In accordance with another aspect of the present invention, there is provided a method for increasing a speed of searching objects when objects having identical object identifier are repeatedly used.

In accordance with an aspect of the present invention, there is provided a method for searching a rights object by using a location data of an object in a portable storage device, the method comprising: accessing the portable storage device; transmitting an object identifier to the portable storage device; receiving a location data of a first object searched based on the object identifier from the portable storage device; storing the location data of the first object with the object identifier; and transmitting the location data of the first object and an operation data representing operations to be performed with the first object to the portable storage device by using the location data of the first object.

In accordance with another aspect of the present invention, there is provided a method for searching a rights object by using a location data of an object in a portable storage device, the method comprising: accessing a host device; receiving an object identifier from the host device; searching a location data of an object having the received object identifier in a storing unit storing an object and the object identifier and transmitting the searched location data of the object to the host device; receiving the location data of the object and an operation data representing operations to be performed with the object from the host device; and directly accessing an object of the storing unit by using the received location data of the object and performing operations according to the received operation data.

In accordance with another aspect of the present invention, there is provided an apparatus for searching a rights object by using a location data of an object in a portable storage device, the apparatus including: an application unit for transmitting an object identifier to the portable storage device and receiving a location data of a first object of the object identifier; and a storing unit for storing the object identifier and the location data of the first object, wherein the application unit searches the stored object identifier and transmits a location data of the first object and an operation data representing operations to be performed with the first object.

In accordance with still another aspect of the present invention, there is provided a portable storage device, including: an object data storing unit for storing an object and an object identifier; and an application unit for receiving an object identifier transmitted from a host device, wherein the application unit searches a location data of an object having the object identifier in the object data storing unit, transmits the searched location data of the object, receives a location data of the object and an operation data representing operations to be performed with the object from the host device, and performs operations according to received operation data by directly accessing an object in the storing unit by using the location data.

BRIEF DESCRIPTION OF THE DRAWINGS

The above and other aspects of the present invention will become better understood with regard to the following description of the exemplary embodiments given in conjunction with the accompanying drawings, in which:

FIG. 3 is a block diagram depicting an object table in accordance with an exemplary embodiment of the present invention;

FIG. 4 is a diagram representing a table storing identifier or information of identifications by using a cryptographic hash in accordance with an exemplary embodiment of the present invention;

FIG. 6 is diagram illustrating a table of a storing unit storing therein an object identifier and object location data in accordance with an exemplary embodiment of the present invention.

DETAILED DESCRIPTION OF THE INVENTION

Figure 1:
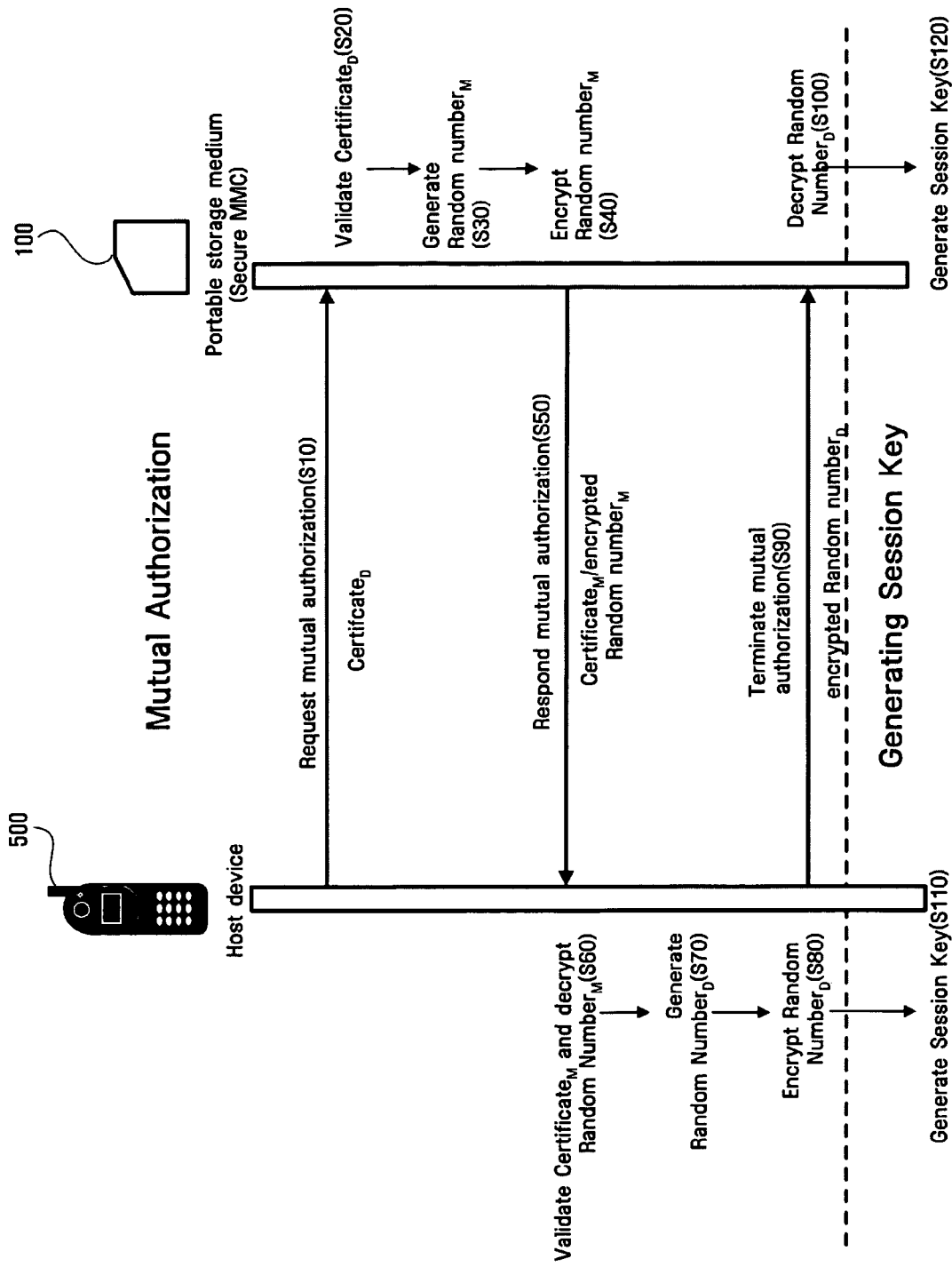
FIG. 1 is a diagram showing mutual authorization in accordance with an exemplary embodiment of the present invention.

Hereinafter, the terms used throughout the specification are defined as follows.

A "host device" refers to a device using a rights object stored in a portable storage device as connected to the portable storage device. The host device includes portable multimedia devices such as a mobile phone and a personal digital assistant (PDA), and multimedia devices such as a computer and a digital television. The host device is commonly called a device or a host.

A "portable storage device" includes a storage medium having non-volatile memory such as a flash memory, available for reading, writing and erasing. By way of example, the portable storage device includes a smart media, a memory stick, a compact flash (CF) card, an XD card, a multimedia card and a universal serial bus (USB) storage device. The portable storage device will be explained based on a secure MMC hereinafter.

A "rights object" is associated with information about copyrights of digital content, under which rights to play, display, execute, print, export (copy and move), and peruse digital content are established. For performing DRM between the host device and the portable multimedia device, it is necessary to use the rights object containing therein information as to whether any right associated with the digital content has been granted. An object in the specification may refer to the rights object. When the rights object is large-sized, it may be divided to a plurality of parts in a predetermined format, each of which may be a rights object.

An "object data storing unit" stores the objects therein. The object data storing unit may be a storage unit in the portable storage device or a storage medium, or a part of the storage medium. Also, the object data storing unit stores identification data for finding an object and may store location data of the object. The object data storing unit may store the above mentioned data in various forms. An exemplary embodiment of the present invention will be described, assuming that the above mentioned data are stored in the form of table in the object data storing unit. An object table to be described later constitutes an exemplary embodiment of the present invention, to which the scope of the present invention will not be limited.

The object table includes rights objects and information about objects such as location data, identification (or identifier) fields and metadata. The location data represents a location at which the rights object is stored in the object data storing unit. By using the location data, the objects stored in the portable storage unit may be read and written.

The metadata includes state information of the object necessary to store the object and an object mapping table stores states of objects stored in the object table.

An "object identifier" is a reference for searching and identifying an object from objects. There may exist a plurality of identifiers, or identification data for a single object. For example, in a case of an object storing therein rights of a specific content, a content identifier (content ID), a name of a content producer or a producer identifier may be used as the identifier of the object. The object identifier may also be used for determining whether an object provides rights of playing, or copying or moving the corresponding content. Furthermore, with an identifier or identification data containing information about the term to use the object, any object whose term to be used has been expired can be searched. The identifications of an object are used for searching for any object satisfying concerned conditions without analyzing the object. That is, the object identifiers are required for searching an object. Therefore, it can be defined in many ways. A rights object identifier (Rights Object ID) assigned to each object may also be used as an identification of the object.

An "object mapping data storing unit" represents states of objects stored in the object data storing unit. For example, the object mapping data storing unit, if it is constructed with consecutive bits, will represent only whether the object has been stored therein. However, the object mapping data storing unit constructed with a table format can store more data therein. In the present invention, the object mapping data storing unit is implemented as the table format, to which the present invention will not be limited. The table format of the object mapping data storing unit is called an "object mapping table" hereinafter.

The host device and the portable storage unit may be connected through a wired communication link or a wireless communication link. The present invention covers a wireless connection of the host device with the portable storage device. This implies that data is transmitted and received between the host device and the portable storage device through both a wired link and a wireless link. That is, access or connection is not limited to a physical connection between the host device and the portable storage device. Also, access or connection implies a state of transferring and receiving data between the host device and the portable storage device by physical attachment or connection, without physical contact. With recent development of wireless techniques, various data transmission and reception in a wireless manner has increased. In the present invention, data transmission between the host device and the portable storage device covers data transmission between them through a wireless communication link.

In the embodiments of the present invention described below, a "part" or a "module" indicates a software component or a hardware component such as a field-programmable gate array (FPGA) or an application-specific integrated circuit (ASIC). The module performs a particular function but is not restricted to software and hardware. The module may be included in an addressable storage medium or may be configured to play one or more processors. Accordingly, modules may include components such as software components, object-oriented software components, class components, and task components, processes, functions, attributes, procedures, subroutines, segments of a program code, drivers, firmware, microcodes, circuits, data, databases, data structures, tables, arrays, and parameters. Components and features provided by modules may be combined into a smaller number of components and a smaller number of modules, or may be divided into a greater number of components and a greater number of modules. In addition, components and modules may be implemented such that they play one or more central processing units (CPUs) in a device or a secure MMC.

Hereinafter, the exemplary embodiments of the present invention will be described in more detail with reference to the accompanying drawings.

FIG. 1 is a diagram showing mutual authorization in accordance with an exemplary embodiment of the present invention. Mutual authorization will be described based on a secure multimedia card 100 as an exemplary embodiment of a portable storage device with respect to FIG. 1. In the mutual authorization, a host device 500 and the secure multimedia card 100 verify whether they are authorized and exchange random numbers for generating session keys between the host device 500 and the secure multimedia card 100, and session keys are generated by use of the random numbers obtained through the mutual authorization. In FIG. 1, a command to request a counterpart device to take an operation is indicated above each horizontal arrow and a parameter according to the command or data to be transmitted is indicated below each of the horizontal arrow. In the exemplary embodiment of the present invention, all the commands for mutual authorization are transferred by the host device 500 to the secure multimedia card 100 and the secure multimedia card 100 performs an operation corresponding to the command transferred from the host device 500. For example, when the host device 500 transfers a command to respond to a mutual authorization to the secure multimedia card 100, the secure multimedia card 100 receives the command and then transmits a certificate M and an encrypted random number M to the host device 500. In another exemplary embodiment of the present invention, both of the host device 500 and the secure multimedia card 100 may issue commands. In this case, the secure multimedia card 100 may transmit the certificate M and the encrypted random number M to the host device 500 in responding to the mutual authorization. Hereinafter, the mutual authorization will be described in detail.

At first, the host device 500 requests the secure multimedia card to perform a mutual authorization (operation S10). When requesting the mutual authorization, the host device 500 also transfers a device publication key (PubKeyD) that it has to the secure multimedia card 100. In an exemplary embodiment of the present invention, a device certificate (Certificate$_D$) issued relative to the host device 500 from a certification authority is transmitted to the secure multimedia card 100 together with the device publication key (PubKeyD) in operation S10. The device certificate (Certificate$_D$) includes a device ID, the publication key (PubKeyD) and an electronic signature by the certification authority. Based on the received device certificate (Certificate$_D$), the secure multimedia card 100 determines whether the host device 500 is authorized and also obtains the device publication key (PubKeyD).

The secure multimedia card 100 determines validity of the device certificate (Certificate$_D$) by using a certificate revocation list (CRL) (operation S20). If the host device 50 is included in the CRL, the secure multimedia card 100 refuses the request for mutual authorization from the host device 500. If the host device 50 is not included in the CRL, the secure multimedia card 100 obtains the device publication key (PubKeyD) through the device certificate (Certificate$_D$).

Thereafter, the secure multimedia card 100 generates a random number M (operation S30). The generated random number M is encrypted using the device publication key (PubKeyD) in operation S40. And then, the secure multimedia card 100 receives a command to respond to a mutual authorization from the host device 500 or otherwise it transmits a command to respond to a mutual authorization to the host device 500 (operation S50). In responding to the mutual authorization, the secure multimedia card 100 transmits a publication key (PubKeyM) of the secure multimedia card and an encrypted random number M to the host device 500. In an exemplary embodiment, a certificate (Certificate$_M$) of the secure multimedia card may be transmitted instead of the publication key (PubKeyM) of the secure multimedia card. In another exemplary embodiment, the secure multimedia card 100 transmits the certificate (Certificate$_M$) of the secure multimedia card, the encrypted random number M and an electronic signature (SigM) of the secure multimedia card to the host device 500.

The host device 500 receives the certificate (Certificate$_M$) of the secure multimedia card and the encrypted random number M, determines whether the secure multimedia card 100 is authorized by using the certificate (Certificate$_M$), obtains the publication key (PubKeyM) of the secure multimedia card, and obtains the random number M by decrypting the encrypted random number M into a device private key (PrivKeyD) S60. The host device 500 then generates a random number D (operation S70) and encrypts the random number D as a publication key (PubKeyM) of the secure multimedia card (operation S80). Thereafter, termination of mutual authorization is performed (operation S90). In the termination of mutual authorization, the host device 500 transmits the encrypted random number D to the secure multimedia card 100. In the exemplary embodiment of the present invention, the host device 500 transmits an electronic signature (SigD) of the host device together with the encrypted random number D to the secure multimedia card 100.

The secure multimedia card 100 receives the encrypted random number D and decrypts it (operation S100). Accordingly, the host device 500 and the secure multimedia card 100 both know the random numbers generated by them. In the exemplary embodiment, since random numbers are generated and used by both of the host device 500 and the secure multimedia card 100, randomness of the numbers is increased and thus secure mutual authorization is available. That is, even if one of the host device 500 and the secure multimedia card 100 generates a number having low randomness, the low randomness can be supplemented by the other thereof.

Figure 2:
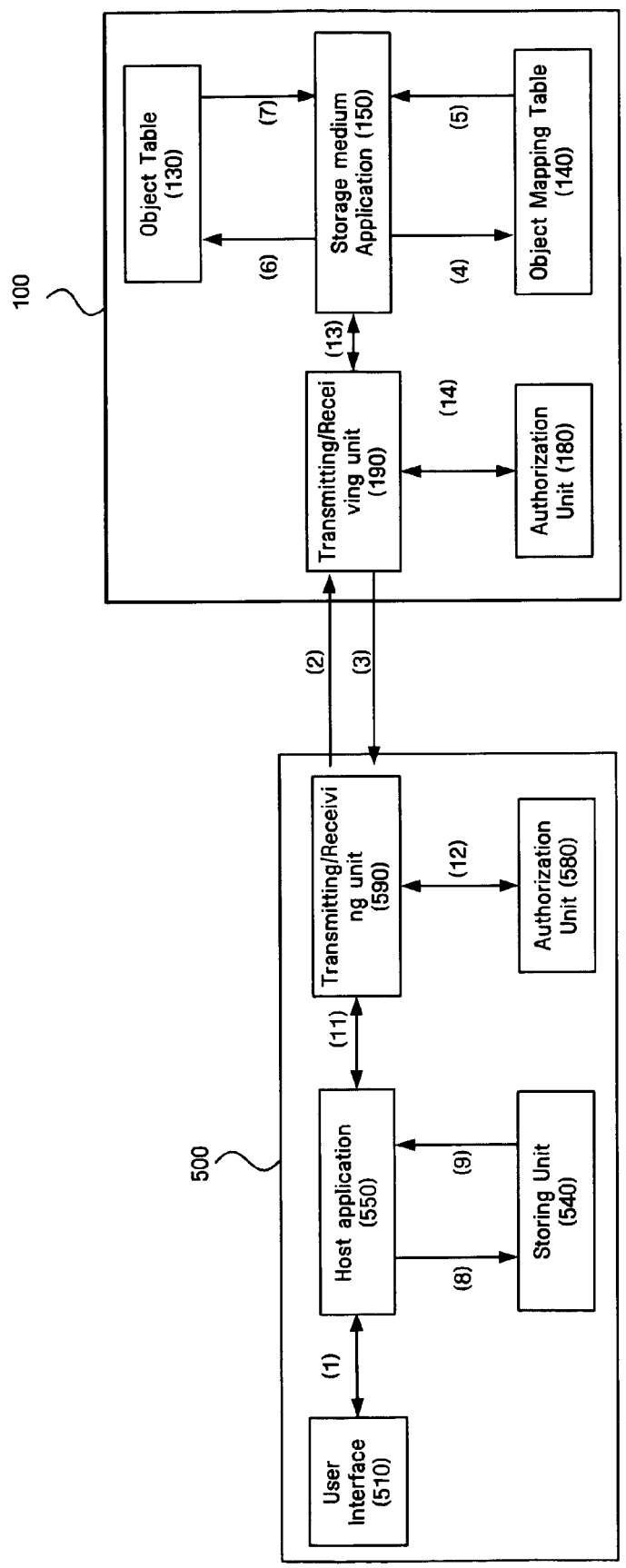
FIG. 2 is a diagram illustrating a construction and an interaction of a host device and a portable storage device in accordance with an exemplary embodiment of the present invention.

FIG. 2 is a block diagram illustrating a construction and an interconnection a host device and a portable storage device in accordance with an exemplary embodiment of the present invention.

In FIG. 2, the host device 500 and the portable storage device 100 are interconnected through a communication link. The communication link includes a wired communication link and the wireless communication link.

As shown in FIG. 2, the host device 500 includes a user interface 510, a storing unit 540, a host application 550, an authorization unit 580 and a transmitting/receiving unit 590. The host device 500 provides an interface to a user for receiving a command from the user and outputting a result of the command to the user by using the user interface 510. The user requests the host device 500 to reproduce, copy or move predetermined multimedia content through the user interface 510. According to this information to reproduce, copy or move rights objects is required. The storing unit 540 stores objects therein. The host application 550 performs operations to request information about rights object from the portable storage device 100. The transmitting/receiving unit 590 transmits data to or receives data from the portable storage device 100. The authorization unit 580 performs operations for mutual authorization shown in FIG. 1 and encrypting/decrypting of the data.

The mobile storage device 100 includes an object table 130, an object mapping table 140, a storage medium application 150, an authorization unit 180 and a transmitting/receiving unit 190. The storage medium application 150 performs a read or write operation according to a request from the host device 500. The transmitting/receiving unit 190 transmits data to or receives data from the host device 500 and the authorization unit 180 performs operations for mutual authorization shown in FIG. 1 and operations for decrypting/encrypting of the data.

Operations of the host device 500 and the portable storage device 100 will be explained in detail by referring to FIG. 2.

When the host device 500 and the portable storage device 100 are interconnected, mutual authorization is performed as shown in FIG. 1. The mutual authorization is performed by the authorization units 180 and 580 respectively in the host device 500 and the portable storage device 100.

After the mutual authorization is completed, the host device 500 and the portable storage device 100 encrypt or decrypt the data transmitted/received by using session keys generated during the mutual authorization (operations 12 and 14). And, the host device 500 and the storage medium application 150 exchange the data through the transmitting/receiving units (operations 11 and 13).

The user interface 510 requests the host application 550 to perform a predetermined operation (operation 1).

Accordingly, the host application 550 performs the predetermined operation such as searching, reading or writing with respect to an object. The host application 550 determines whether an object is in the host device or the portable storage device, for searching the object.

The host application 550 may request information about the object from the portable storage device 100 or may read information about object, for using the object or for using information about the object (operations 2 and 3). The host application 550 refers to an application operated in the host device 500 and requires one or more objects stored in the portable storage device 100 simultaneously or consecutively.

By storing the object in the storing unit 540, the host application 550 can use content (operations 8 and 9). And, the object may be stored in the portable storage device.

For finding out information requested from the host application 550 or performing requested operations, the storage medium application 150 may obtain information about a state of the object through the object mapping table 140, or write or modify the information (operations 4 and 5). Also, the storage medium application 150 performs operations for reading, modifying or deleting objects and object identifiers stored in the object table (operations 6 and 7). Furthermore, the host application 550 stores the objects and the object identifiers read from the portable storage device 100 in the storing unit 540 and the stored objects and the object identifiers in the storing unit 540 can be later reused.

The data exchanged between the host application and the storage medium application is encrypted by using the session key generated during mutual authorization shown in FIG. 1 and the encrypted data is transmitted to the host device 500 or the portable storage device 100.

FIG. 3 is a block diagram illustrating an object table in accordance with an exemplary embodiment of the present invention.

As shown in FIG. 3, the object table includes objects and identifier or identification data required for searching a predetermined object. And, location data about the object may be selectively included in the object table. The object identifier may serve as a key for searching the object. For example, the identification data may include a content identifier (Content ID) representing a content related to corresponding object, a content provider identifier (Content Provider ID) representing a provider of the content related to the corresponding object and a rights object identifier (Rights Object ID) of corresponding object. The object identifier may also include more information about the object and the object can be searched by using the object identifier.

For example, in order to know which right the object has, there may be an identifier representing rights for playing or another identification representing rights for copying. Also, the term limit for using the corresponding object may be used as the identifier. When there are plenty of the identification data, the host application 500 can search a predetermined object by using the identification data without accessing the information about the object.

A metadata field 139 includes information representing whether data is stored in the corresponding object, or modified or deleted.

Furthermore, the portable storage device includes an object mapping table representing whether information about the object table has been modified.

Although the object table includes the objects and the object identifiers, the objects are not consecutively stored in the object table. The objects may be deleted. In this case, in lieu of actually deleting one of objects, information about deletion of the object is stored in the object mapping table 140 and then a newly added object can be stored in the corresponding location of the deleted object by using the object mapping table 140. The objects are stored in an object field 132. For example, when the object stored in the fifth row of the object table is to be deleted because the term limit for using it has expired, the object stored in the fifth row of the table may be actually deleted. However, if deletion of the object can be represented by use of the object mapping table, this may decrease the time consumed in deleting the object and its identification. Also, since existence of the object can be reviewed through the object mapping table in the course of searching for the object, the likelihood of searching for the deleted object would be reduced.

An object location data field 131 represents an address at which the object is stored. The object location data field 131 may be omitted. If the objects have predetermined lengths and the identifiers to identify the objects are identical in length through a hash function, locations of the objects can be easily calculated. In this case, no object location data is required. The identification data of the objects may be stored to have an identical length by using a hash function. For example, a hash function may be used for allocating eight bytes for the identification in a first field 133 and seven bytes for the identification in a second field 134. Particularly, a cryptographic hash may be used. The cryptographic hash converts random data A to a hash value B having a predetermined length. Here, the random data A cannot be analogized by using the hash value B alone. Also, it is impossible to obtain another data C which is converted to the hash value B by using only the random data A and the hash value B. SHA1,MD4,or MD5 may be used as the cryptographic hash.

The stored object in FIG. 3 may represent a single rights object or it may be divided into a plurality of assets. When the rights object is divided into plural assets, these assets may be entered in the object table as objects, and a rights object identifier and an asset identification may be entered in an object identifier field.

Also, identifier may be a unique value whereby an object can be distinguished from other rights objects stored in the same device or other devices or to be issued in the future, and the length of the identifier may vary. For storing the identifier having variable length in a portable storage device having a limited storage space, it is necessary that the identifier has a fixed length and is further reduced by using the cryptographic hash. By using the cryptographic hash to store the identifier, security of the data can be highly enhanced. For using the identifier stored through the cryptographic hash, a hash unit performing the cryptographic hash must be included in the portable storage device and the host device because the host device may search the object identifier table by converting a predetermined value to a hash value when searching for the predetermined value.

As shown in FIG. 3, the portable storage device includes the object mapping table. Since information about deletion of objects or modification of objects is maintained in the object mapping table, it can be detected whether an object has been deleted before searching for the corresponding object. Owing to this, the speed of searching may increase.

FIG. 4 is a diagram showing a table storing identifiers by using a cryptographic hash in accordance with an exemplary embodiment of the present invention.

An object table storing objects and identifiers therein is illustrated in FIG. 4.

Objects are stored in the object table. The object may be a single rights object or a part of the rights object divided. For storing objects in the object table, a fixed length thereof may be required. If the rights object is longer than the fixed length, the rights object may be divided and then stored. This implies that the table can be consecutively stored in a storage medium.

There may be various identifiers for searching objects. In the object table shown in FIG. 4, a content identifier, a rights object identifier and a content provider are used as the identifiers of an object. For searching a rights object, the search may be performed by using the content identifier stored in the host device or by using the rights object identifier. Otherwise, the search may be performed using content specific information. For example, if content is music data, the name of a composer or the name of a singer can be content specific information. The above mentioned identifiers may be various lengths. However, the identifiers having various lengths may make it difficult to estimate an accurate location of the object in the object table. Accordingly, in the exemplary embodiment of the present invention, the identifiers are stored by using the cryptographic hash. The cryptographic hash converts random data A into a hash value B having a predetermined length. At this time, the random data A cannot be analogized only by using the hash value B. Also, it is impossible to obtain another data C different from the random data A converted into the same hash value B by using only the random data A and the hash value B. SHA1,MD4,or MD5 may be used as the cryptographic hash.

For example, content identifiers of an object 1, an object 2 and an object 3 may respectively be 1058, 132 and 7985214. However, the lengths of the object 1, the object 2 and the object 3 may be fixed if they are stored with the same length using the cryptographic hash. Likewise, this will apply to rights object identifiers and content providers.

If the host device and the portable storage device include identical hash units, a hash value of an identifier to be located in the host device is obtained through the hash unit and location data of an object can be obtained by searching for object identifier table stored in the host device.

Figure 5:
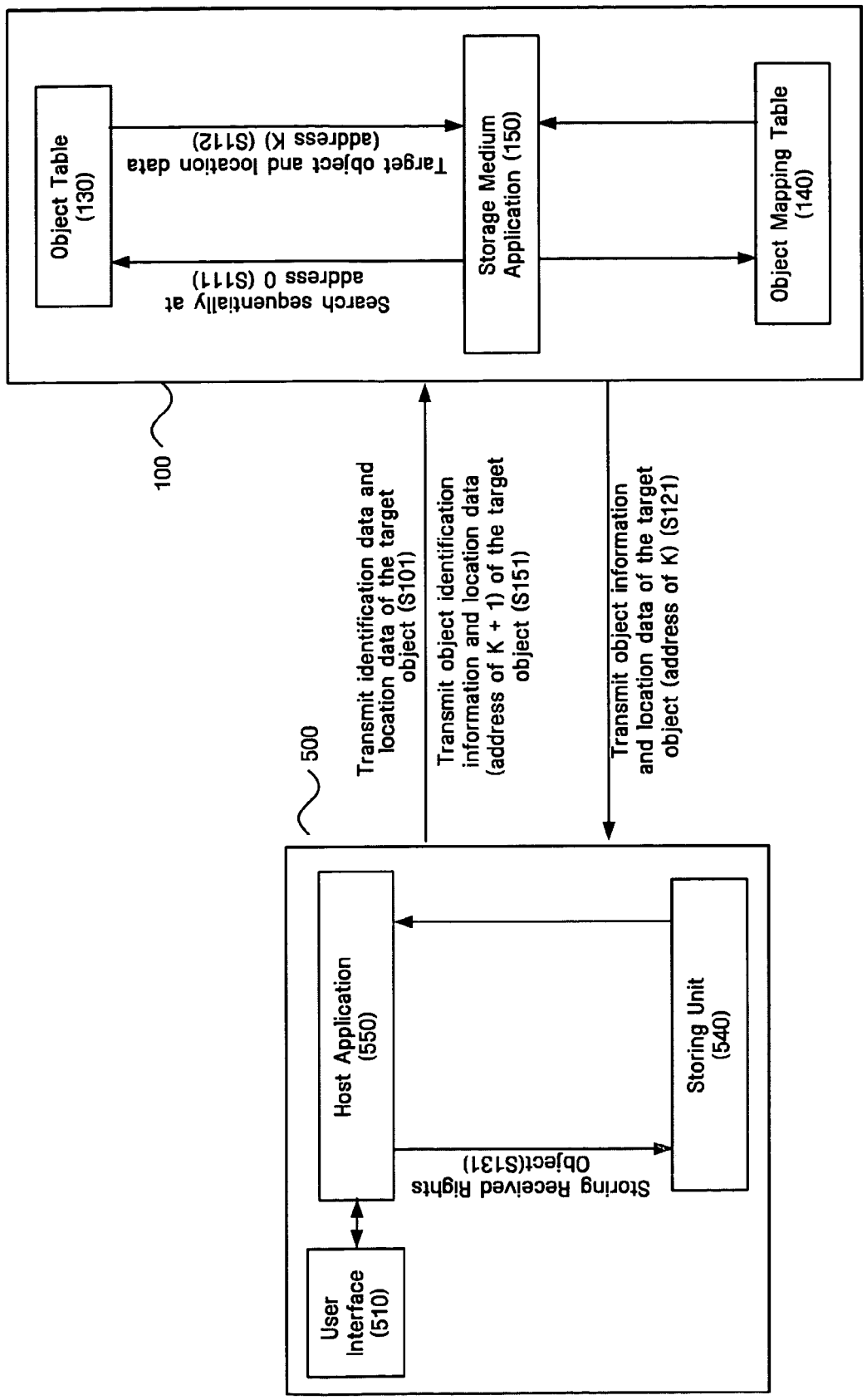
FIG. 5 is a diagram depicting an initial access to objects stored in the portable storage device in accordance with an exemplary embodiment of the present invention.

Also, the object table shown in FIG. 5 includes empty object identifier fields in a part to allow the host device to use the empty object identifier fields, thereby generating new object identifiers. For example, if it is not decided which identifier will be used and thus the identifier 4 is emptied, this identifier is newly established in the application of the host device and then stored in the object table.

For the sake of convenience in describing the present invention, description of the transmitting/receiving units and the authorization units in the host device and the portable storage device will be omitted. Data transmission and reception between the host device and the portable storage device are made through the transmitting/receiving units and the data are encrypted and decrypted by the authorization units.

FIG. 5 is a diagram depicting an initial access to objects stored in a portable storage device in accordance with an exemplary embodiment of the present invention.

As shown in FIG. 5, a host application 550 transmits identification data and location data of the target object (operation S101). The identification data may be a content identifier or a content provider as shown in FIGS. 3 and 4. Even though a rights object is divided in parts and divided parts are stored, the divided parts may also be used as identification data for the target object. At operation S101, if no information of the target object according to corresponding identifier is provided, then, an address of 0 is transmitted as an initial address for searching for the target object successively. In another exemplary embodiment of the present invention, the host application 550 transmits only identification data. In this case, a storage medium application searches for the identifier by using an internal address reference such as address of 0 or address of 1. Also, a first address at which the target object is stored may be used as an initial address for searching for the target object.

A storage medium application 150 receives the identification data and the location data from the host application 550 and sequentially searches for the target object from the 0 address (operation S111). The target object may be searched by comparing the received identification data with identifiers of objects stored in the object table. In a case of finding an identical identifier, the storage medium application 150 reads out the found object, location data K of the found object and identification data of the found object (operation S112). The found object, the location data K and the identification data are transmitted to the host application (operation S121). The information may be stored in a storing unit 540 (operation S131). Also, the transmitted object may not be stored but only the location data K and the identification data may be stored.

Meanwhile, more than one of the target objects may have an identifier, and thus, the identification data may be transmitted again to search for another object. In this case, address K+1 is transmitted as the location data of the target object (operation S151) because the storage medium application 150 has already found the previous target object by searching for the object table from address 0 to address K. By searching for the target object form the address K+1, time for searching for the target object can be decreased. In the exemplary embodiment of the present invention, the address K+1 is transmitted, but location data using the previous search result can also be transmitted. For example, address K can be transmitted to the storage medium application to search for the target object from the address K+1. After the storage medium application 150 receives the address (location data) to begin to search for the target object at operation S151, it repeats operations S111 and S112 for finding an object, identification data and location data. After then, operation S121 is performed for transmitting the found object, the found identification data and the location data (L) to the host application 550. The above mentioned operations are repeatedly performed until all objects included in the target object identifier are found in the storage medium.

FIG. 6 is a diagram illustrating a table of a storing unit storing therein an object identifier and object location data in accordance with an exemplary embodiment of the present invention. The identification data and the location data of the target object found in FIG. 5 may be stored in the table shown in FIG. 6.

In FIG. 6, the table stores types of object identifiers, object identifiers and location data of the associated objects. The type of object identifier represents which object identifier filed is used for searching. That is, the type of object identifier shows whether information on a content producer is searched or whether information included in rights object is searched. In this exemplary embodiment, a content producer, a rights object identifier and a content identifier are included in the type of object identifier field as shown in FIG. 6.

A second column represents values of the object identifier. For example, if the content producer is Beethoven, the object identifier is stored by using a hash function. And, the location data 120, 140 and 300 which are obtained through the operations of FIG. 5 are stored with the hash value of the content producer. If the content producer is the Beatles, the location data 150 and 250 are stored with the hash value of the content producer. After then, the location data is used for obtaining information of the target object. Typically, a memory of the portable storage device uses a technique such as NAND. In this case, a random data may be consecutively searched from a first location. When a specific location of data is provided, direct access to the corresponding position is available. Accordingly, if accesses to a predetermined object are repeated based on the specific data of the object, it is possible to directly access to the predetermined object without searching, by maintaining object identifier data and location data of the predetermined object.

In DRM, a rights object may be repeatedly modified in using a specific rights object. If location data of the rights object is maintained, operations for reading, writing and modifying the rights object can be performed without searching the rights object, thereby decreasing time for using objects stored in the portable storage device. Also, if the rights object is divided into a plurality of rights objects or two or more rights objects are existed for a predetermined content, locations of rights object of the predetermined content must be systematically managed.

The table in FIG. 6 stores therein objects identifiers by obtaining a hash value of each object identifier. In this case, the host device must include a hash unit calculating the hash value of the object identifier by using a hash function. Furthermore, an original object identifier may be stored instead of storing the hash value. In this case, when the original object identifier is transmitted to the portable storage device, it requires converting the original object identifier to a hash value by using the hash function for searching the target object.

Figure 7:
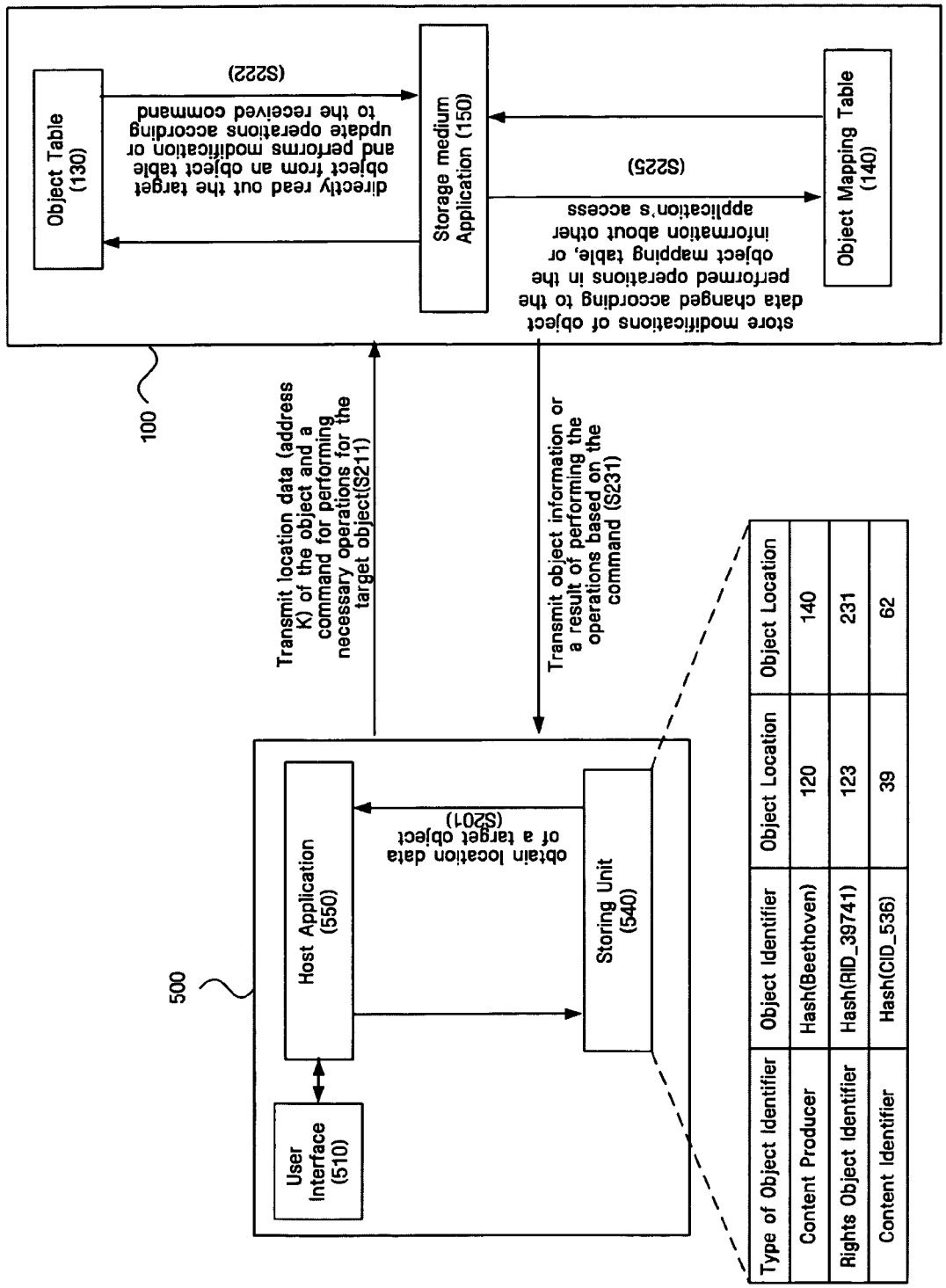
FIG. 7 is a diagram showing an access by a host device to objects stored in the portable storage device by using an object identifier and object location data in accordance with an exemplary embodiment of the present invention.

FIG. 7 is a diagram showing an access by a host devices to objects stored in a portable storage device by using an object identifier and object location data in accordance with an exemplary embodiment of the present invention.

In FIG. 7, a storing unit 540 stores therein object identifiers and object location data according to the table shown in FIG. 6, where the object identifiers and the object location data are obtained by the operations shown in FIG. 5. Having obtained location data of a target object from the storing unit 540 (operation S201), the host application 550 transmits the obtained data and a command for performing necessary operations to the portable storage device (operation S211). The necessary operations may include a read operation for reading out the target object, a modifying operation for modifying the target object, and a read operation for reading out identification of the target object. Having received the obtained information and the command, the portable storage device 150 directly reads out the target object from an object table and performs modification or update operations according to the received command (operation S222). Also, the portable storage device 150 may selectively store modifications of object data changed according to the performed operations in the object mapping table (operation S225). The storage medium application 150 then transmits a result of performing the operations based on the command to the host device 500 (operation S231).

As mentioned above, the present invention can rapidly search for objects stored in the portable storage device, thereby increasing a speed of using the object.

Also, the present invention can reduce time for searching for objects when objects of identical object identifiers are repeatedly used.

While the present invention has been described with respect to certain exemplary embodiments, it will be apparent to those skilled in the art that various changes and modifications may be made without departing from the spirits and scope of the invention as defined in the following claims.

What is claimed is:

1. A method for searching for a rights object by using location data of an object in a portable storage device, the comprising:
    a) accessing the portable storage device;
    b) transmitting an object identifier to the portable storage device;
    c) receiving location data of a first object searched for by the portable storage device based on the object identifier from the portable storage device;
    d) storing the location data of the first object with the object identifier; and
    e) transmitting the location data of the first object and data of an operation performed with respect to the first object to the portable storage device using the location data of the first object.

2. The method of claim 1, further comprising f) sharing a session key with the portable storage device for mutual authorization after a), wherein data transmitted to or received from the portable storage device is encrypted using the session key.

3. The method of claim 1, further comprising:
    f) transmitting the location data of the first object and the object identifier to the portable storage device after d);
    g) receiving location data of a second object searched for based on the object identifier from the portable storage device; and
    h) storing the location data of the second object.

4. The method of claim 1, wherein b) includes transmitting the object identifier and the location data which is a reference for searching for the object in the portable storage device.

5. The method of claim 1, wherein the object identifier is a value obtained by a hash.

6. The method of claim 1, wherein the object identifier includes one of identification data of a content related to the object, identification data related to use of the object and an identification data of a subject generating the object.

7. The method of claim 1, wherein the object is a rights object including rights information of a content or a part of the rights object.

8. A method for searching for a rights object by using location data of an object in a portable storage device, the method comprising:
    a) accessing a host device;
    b) receiving an object identifier from the host device;
    c) searching for location data of an object having the object identifier in a storing unit storing therein the object and the object identifier, and transmitting the location data of the object to the host device;
    d) receiving the location data of the object and data of operations to be performed with respect to the object from the host device; and
    e) directly accessing the object stored in the storing unit using the received location data of the object, and performing the operations according to the data which is received.

9. The method of claim 8, further comprising f) sharing a session key through mutual authorization with the host device after a), wherein data transmitted to or received from the host device is encrypted using the session key.

10. The method of claim 8, wherein if the location data of the object is additionally received in b), the location data of the object is searched in the storing unit based on the location data which is received.

11. The method of claim 8, wherein if the location data of the object is not additionally received in b), the location data of the object is searched based on a predetermined location in the storing unit.

12. The method of claim 8, wherein the storing unit is a table.

13. The method of claim 8, further comprising g) recording modifications of the object after e).

14. The method of claim 8, wherein e) includes displaying whether the object is updated to the storing unit, if an operation to be performed with respect to the object is to update the object.

15. The method of claim 8, wherein the object identifier is a value obtained by a hash.

16. The method of claim 8, wherein the object identifier includes one of identification data of a content related to the object, identification data related to use of the object and identification data of a subject generating the object.

17. The method of claim 8, wherein the object is a rights object including rights information of a content or a part of the rights object.

18. An apparatus for searching for a rights object by using location data of an object in a portable storage device, the apparatus comprising:
    an application unit which transmits an object identifier to the portable storage device and receives location data of a first object of the object identifier; and
    a storing unit which stores the object identifier and the location data of the first object,
    wherein the application unit searches for the object identifier stored in the storing unit and transmits the location data of the first object and data of operations to be performed with respect to the first object.

19. The apparatus of claim 18, further comprising an authorization unit which performs mutual authorization with the portable storage device and shares a session key with the portable storage device, wherein data transmitted to and received from the portable storage device is encrypted using the session key.

20. The apparatus of claim 18, wherein the application unit transmits the object identifier and the first object location data, receives location data of a second object searched by the portable storage device based on the object identifier from the portable storage device and stores the location data of the second object in the storing unit.

21. The apparatus of claim 18, wherein the application unit additionally transmits the location data serving as a reference to search for the object in the portable storage device.

22. The apparatus of claim 18, wherein the application unit searches for identification data of the object by using a value obtained using a hash.

23. The apparatus of claim 18, wherein the object identifier is a value obtained using a hash.

24. The apparatus of claim 18, wherein the object identifier includes one of identification data of a content related to the object, identification data related to use of the object and identification data of a subject generating the object.

25. The apparatus of claim 18, wherein the object is a rights object including rights information of a content or a part of the rights object.

26. A portable storage device comprising:
   an object data storing unit which stores an object and an object identifier; and
   an application unit which receives the object identifier transmitted from a host device,
   wherein the application unit searches for location data of the object having the object identifier in the object data storing unit, transmits the location data of the object which is searched, receives the location data of the object and data of operations to be performed with respect to the object from the host device, and performs operations according to the data which is received by directly accessing the object in the object data storing unit using the location data.

27. The portable storage device of claim 26, further comprising an authorization unit which shares a session key through mutual authorization with the host device, wherein the session key is used for encrypting data transmitted to and received from the host device.

28. The portable storage device of claim 26, wherein if the application unit additionally receives the location data of the object, the location data of the object is searched in the object data storing unit based on the location data which is received as a reference.

29. The portable storage device of claim 26, wherein if the application unit does not additionally receive the location data of the object, the object is searched based on a predetermined location in the object data storing unit.

30. The portable storage device of claim 26, wherein the object data storing unit is a table.

31. The portable storage device of claim 26, wherein after performing the operations, the application unit records modifications of the object changed by performing the operations in an object mapping storing unit including a state of the object.

32. The portable storage device of claim 26, wherein if an operation which is performed is updating the object, the application unit displays whether the object is updated in the object data storing unit.

33. The portable storage device of claim 26, wherein the object identifier is a value obtained by using a hash.

34. The portable storage device of claim 26, wherein the object identifier includes one of identification data of a content related to the object, identification data related to use of the object and identification data of a subject generating the object.

35. The portable storage device of claim 26, wherein the object is a rights object including information about rights of a content and a part of the rights object.

* * * * *